(12) United States Patent
Wu

(10) Patent No.: US 11,237,382 B2
(45) Date of Patent: Feb. 1, 2022

(54) OPTICAL MODULE

(71) Applicant: QISDA CORPORATION, Taoyuan (TW)

(72) Inventor: Po-Fu Wu, New Taipei (TW)

(73) Assignee: Qisda Corporation, Taoyuan (TW)

( * ) Notice: Subject to any disclaimer, the term of this patent is extended or adjusted under 35 U.S.C. 154(b) by 381 days.

(21) Appl. No.: 16/525,474

(22) Filed: Jul. 29, 2019

(65) Prior Publication Data
US 2020/0371341 A1 Nov. 26, 2020

(30) Foreign Application Priority Data
May 24, 2019 (CN) .......................... 201910439023.5

(51) Int. Cl.
G02B 26/00 (2006.01)
G01P 3/44 (2006.01)
G02B 5/20 (2006.01)

(52) U.S. Cl.
CPC .............. G02B 26/008 (2013.01); G01P 3/44 (2013.01); G02B 5/20 (2013.01)

(58) Field of Classification Search
CPC .............. G02B 6/008; G02B 5/20; G01P 3/44
See application file for complete search history.

(56) References Cited

U.S. PATENT DOCUMENTS

2019/0017680 A1* 1/2019 Rasmussen ............. F21V 15/01
2020/0319540 A1* 10/2020 Kato .................. G02B 27/0068

FOREIGN PATENT DOCUMENTS

| CN | 203705797 U | * | 7/2014 |
| CN | 203705797 U | | 7/2014 |
| CN | 109491188 A | * | 3/2019 |
| CN | 109491188 A | | 3/2019 |

* cited by examiner

Primary Examiner — Rajarshi Chakraborty
Assistant Examiner — Nathaniel J Lee

(57) ABSTRACT

An optical module includes a driving unit, a first color wheel, a second color wheel, a first electromagnet, a plurality of first magnets and a polarity control unit. The driving unit has a rotating shaft. The first color wheel is fixed on the rotating shaft. The second color wheel is freely disposed on the rotating shaft. The first electromagnet is disposed on the first color wheel and the first magnets are disposed on the second color wheel. The driving unit drives the first color wheel to rotate, such that the first electromagnet rotates along with the first color wheel. The polarity control unit controls a direction of current flow in the first electromagnet to control a polarity of the first electromagnet, such that the first electromagnet attracts one of the first magnets during rotation to drive the second color wheel to rotate along with the first color wheel.

11 Claims, 8 Drawing Sheets

OPTICAL MODULE

BACKGROUND OF THE INVENTION

1. Field of the Invention

The invention relates to an optical module and, more particularly, to an optical module capable of switching a color mode.

2. Description of the Prior Art

A color wheel is a color source of a digital light processing (DLP) projector. A light emitted by a light source is reflected by a digital micromirror device (DMF) and then passes through the color wheel, so as to render different colors. At present, the color wheel in some projectors is replaceable, such that a user may replace the color wheel manually according to a desired color mode. However, the aforesaid manual operation is inconvenient for the user. Furthermore, some projectors may be equipped with two color wheels with different color modes and utilizes a driving mechanism to drive one color wheel to move with respect to the other color wheel, so as to switch the color mode. However, the aforesaid driving mechanism is complicated and the cost thereof is high.

SUMMARY OF THE INVENTION

An objective of the invention is to provide an optical module capable of switching a color mode, so as to solve the aforesaid problems.

According to an embodiment of the invention, an optical module comprises a driving unit, a first color wheel, a second color wheel, a first electromagnet, a plurality of first magnets and a polarity control unit. The driving unit has a rotating shaft. The first color wheel is fixed on the rotating shaft and the first color wheel comprises a plurality of first filters. The second color wheel is freely disposed on the rotating shaft and the second color wheel comprises a plurality of second filters. The first electromagnet is disposed on the first color wheel and the first magnets are disposed on the second color wheel. A north pole of at least one of the first magnets faces the first color wheel and a south pole of at least another one of the first magnets faces the first color wheel. The polarity control unit is electrically connected to the first electromagnet. The driving unit drives the first color wheel to rotate, such that the first electromagnet rotates along with the first color wheel. The polarity control unit controls a direction of current flow in the first electromagnet to control a polarity of the first electromagnet, such that the first electromagnet attracts one of the first magnets during rotation to drive the second color wheel to rotate along with the first color wheel.

As mentioned in the above, the optical module of the invention controls the polarity of the electromagnet by the polarity control unit, such that the electromagnet attracts different magnets during rotation to switch a color mode. Furthermore, the two color wheels can be positioned with each other precisely by the magnetic attraction between the electromagnet and the magnet. Accordingly, the invention can switch the color mode rapidly according to different color requirements by simple structural configuration and magnetic attraction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
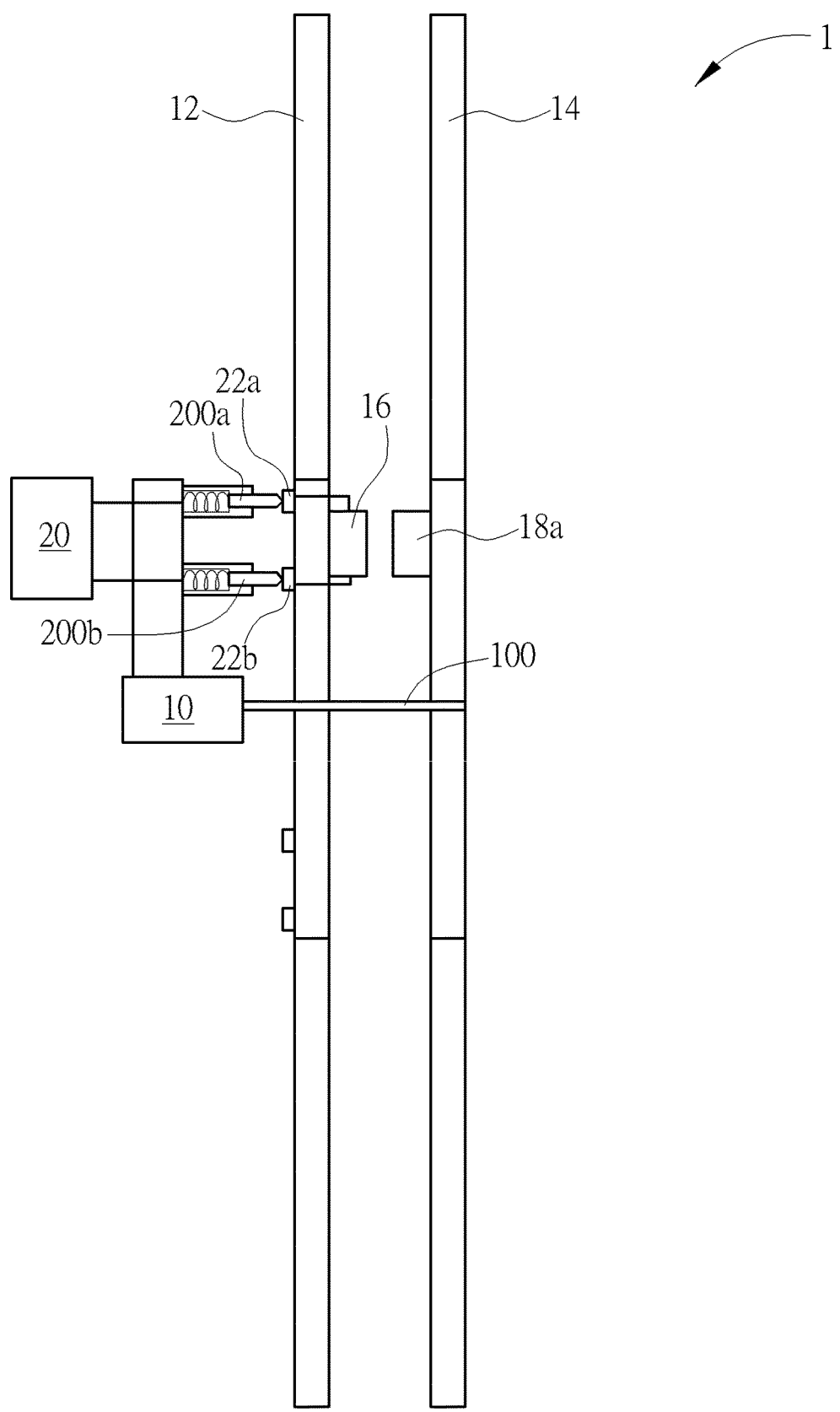
FIG. 1 is a schematic diagram illustrating an optical module according to an embodiment of the invention.
Figure 2B:
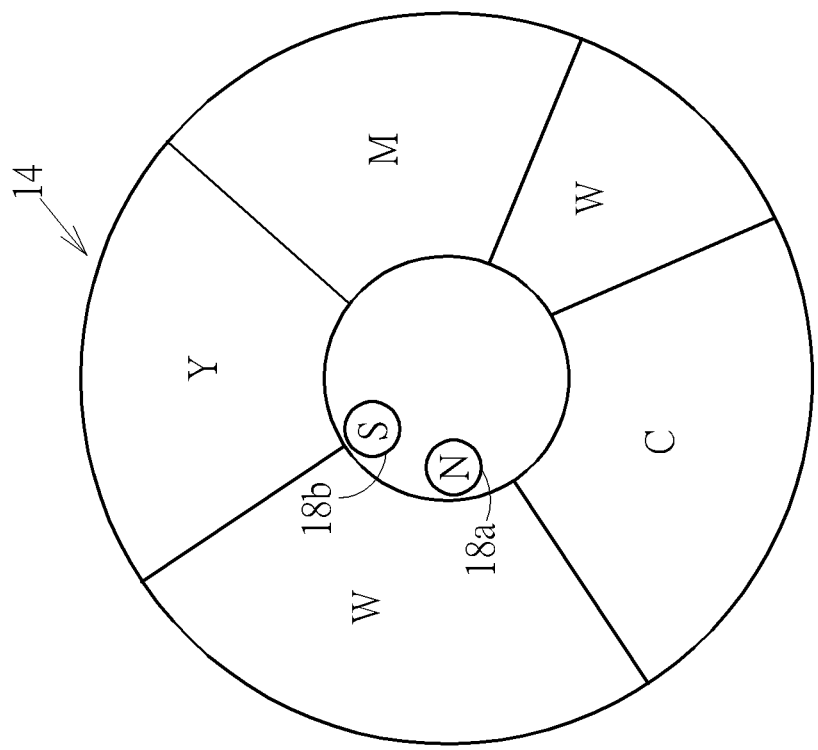
FIGS. 2A and 2B are schematic diagrams illustrating the first color wheel and the second color wheel shown in FIG. 1.
Figure 2A:
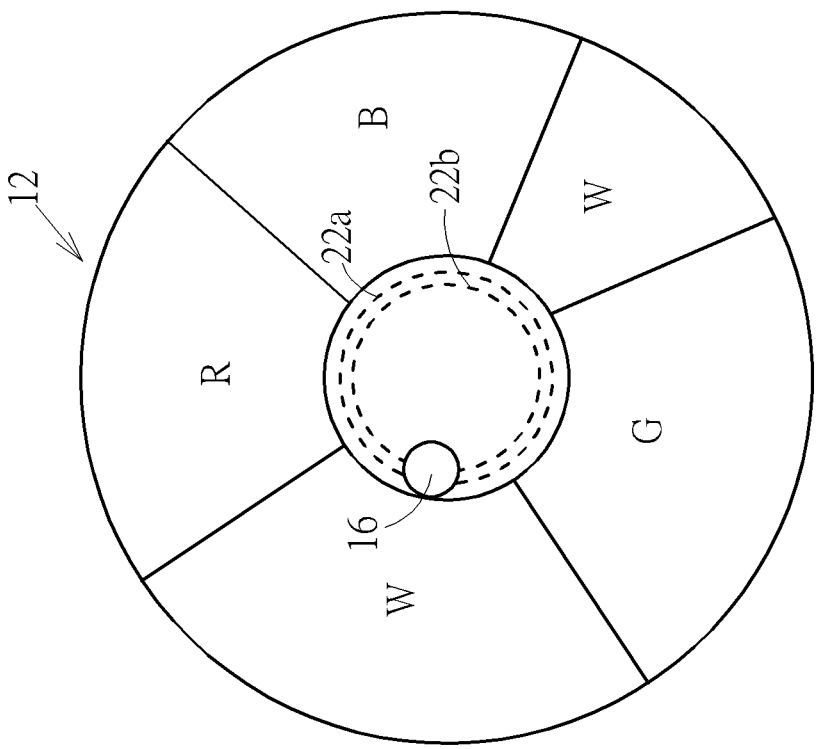
Figure 3:
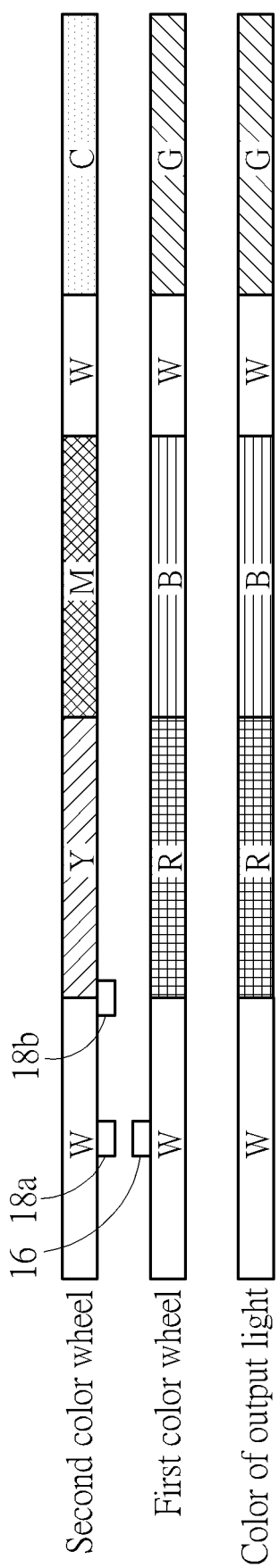
FIG. 3 is a schematic diagram illustrating the colors of output light after the light passes through the second color wheel and the first color wheel in sequence.
Figure 4:
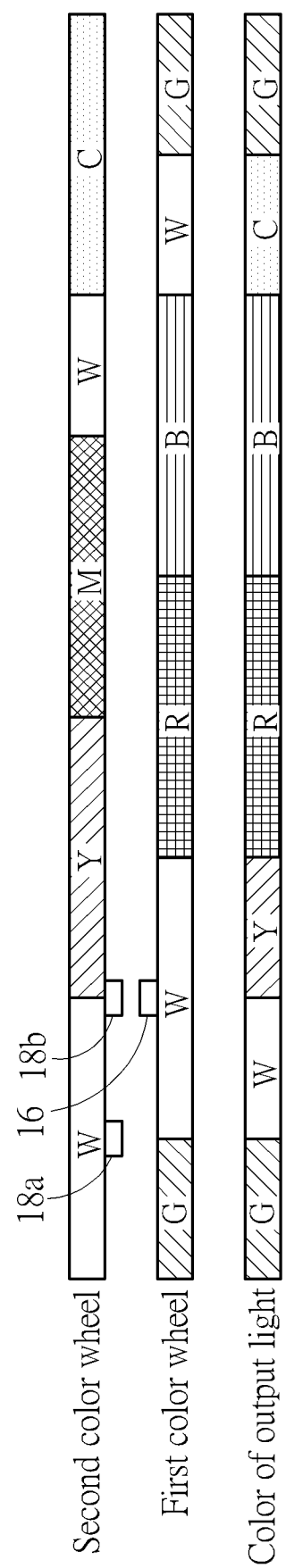
FIG. 4 is another schematic diagram illustrating the colors of output light after the light passes through the second color wheel and the first color wheel in sequence.

Referring to FIGS. 1 to 4, FIG. 1 is a schematic diagram illustrating an optical module 1 according to an embodiment of the invention, FIGS. 2A and 2B are schematic diagrams illustrating the first color wheel 12 and the second color wheel 14 shown in FIG. 1, FIG. 3 is a schematic diagram illustrating the colors of output light after the light passes through the second color wheel 14 and the first color wheel 12 in sequence, and FIG. 4 is another schematic diagram illustrating the colors of output light after the light passes through the second color wheel 14 and the first color wheel 12 in sequence.

As shown in FIGS. 1, 2A and 2B, the optical module 1 comprises a driving unit 10, a first color wheel 12, a second color wheel 14, a first electromagnetic 16, a plurality of first magnets 18a, 18b and a polarity control unit 20. The optical module 1 may be applied to a projector or other optical devices to output various colors of light.

In this embodiment, the driving unit 10 may be, but not limited to, a motor. The driving unit 10 has a rotating shaft 100. The first color wheel 12 is fixed on the rotating shaft 100 of the driving unit 10. Accordingly, when the rotating shaft 100 of the driving unit 10 rotates, the rotating shaft 100 drives the first color wheel 12 to rotate. The second color wheel 14 is freely disposed on the rotating shaft 100 of the driving unit 10. Accordingly, when the rotating shaft 100 of the driving unit 10 rotates, the rotating shaft 100 does not drive the second color wheel 14 to rotate. For further illustration, the invention may form a hole on the second color wheel 14 and insert the rotating shaft 100 of the driving unit 10 into the hole of the second color wheel freely, such that the second color wheel 14 is freely disposed on the rotating shaft 100 of the driving unit 10.

In this embodiment, the first color wheel 12 may comprise a plurality of first filters R, G, B and two transparent filters W, and the second color wheel 14 may comprise a plurality of second filters Y, M, C and two transparent filters W, wherein the first filters R, G, B may have primary colors including red, green and blue and the second filters Y, M, C may have secondary colors including yellow, magenta and cyan. It should be noted that the color configuration of the first filters of the first color wheel 12 and the color configuration of the second filters of the second color wheel 14 may be determined according to practical applications, so the invention is not limited to the aforesaid embodiment.

The first electromagnet 16 is disposed on the first color wheel 12 and the first magnets 18a, 18b are disposed on the second color wheel 14, wherein a north pole of at least one of the first magnets 18a, 18b faces the first color wheel 12 and a south pole of at least another one of the first magnets 18a, 18b faces the first color wheel 12. As shown in FIGS. 2A and 2B, the north pole of the first magnet 18a may face the first color wheel 12 and the south pole of the first magnet 18b may face the first color wheel 12. In this embodiment, the first electromagnet 16 may be located at an inner side of the first filters R, G, B and the first magnets 18a, 18b may be located at an inner side of the second filters Y, M, C, but are not so limited. It should be noted that the inner side is a side of the filters close to a central axis of the color wheel in a radial direction of the color wheel, but is not so limited.

The polarity control unit 20 is electrically connected to the first electromagnet 16. Specifically, the optical module 1 further comprises two first ring-shaped electrodes 22a, 22b, wherein the two first ring-shaped electrodes 22a, 22b are disposed on the first color wheel 12, and the first electromagnet 16 and the two first ring-shaped electrodes 22a, 22b are located at opposite sides of the first color wheel 12. The invention may connect two leads of the first electromagnet 16 to the two first ring-shaped electrodes 22a, 22b, such that the first electromagnet 16 is electrically connected to the two first ring-shaped electrodes 22a, 22b. Furthermore, the polarity control unit 20 may have two first pins 200a, 200b, wherein the two first pins 200a, 200b are electrically connected to the two first ring-shaped electrodes 22a, 22b. In this embodiment, the first pins 200a, 200b may be, but not limited to, pogo pins. It should be noted that this embodiment is exemplified by two first ring-shaped electrodes 22a, 22b for illustration purpose. In practical applications, the first pins 200a, 200b may be directly connected to the first electromagnet 16 without the two first ring-shaped electrodes 22a, 22b. The specific structure may be determined according to practical applications and that will not be depicted herein in detail.

Since the first color wheel 12 is fixed on the rotating shaft 100 of the driving unit 10 and the first electromagnet 16 is disposed on the first color wheel 12, the first electromagnet 16 rotates along with the first color wheel 12 when the rotating shaft 100 of the driving unit 10 drives the first color wheel 12 to rotate. When the first color wheel 12 rotates, the first pins 200a, 200b of the polarity control unit 20 keep contact with the first ring-shaped electrodes 22a, 22b. Accordingly, the polarity control unit 20 may supply current to the first electromagnet 16 through the first pins 200a, 200b and the first ring-shaped electrodes 22a, 22b, such that the first electromagnet 16 generates a polarity. Furthermore, the polarity control unit 20 may control a direction of current flow in the first electromagnet 16 to control the polarity of the first electromagnet 16, such that the first electromagnet 16 attracts one of the first magnets 18a, 18b during rotation to drive the second color wheel 14 to rotate along with the first color wheel 12.

When a side of the first electromagnet 16 facing the second color wheel 14 generates a south pole, the first electromagnet 16 attracts the first magnet 18a during rotation to drive the second color wheel 14 to rotate along with the first color wheel 12. At this time, the colors of output light are shown in FIG. 3 after the light passes through the second color wheel 14 and the first color wheel 12 in sequence. When a side of the first electromagnet 16 facing the second color wheel 14 generates a north pole, the first electromagnet 16 attracts the first magnet 18b during rotation to drive the second color wheel 14 to rotate along with the first color wheel 12. At this time, the colors of output light are shown in FIG. 4 after the light passes through the second color wheel 14 and the first color wheel 12 in sequence. In this embodiment, the light may be, but not limited to, white light. Accordingly, as long as the optical module 1 controls the polarity of the first electromagnet 16 by the polarity control unit 20, the optical module 1 can switch a color mode rapidly according to different color requirements.

Figure 5:
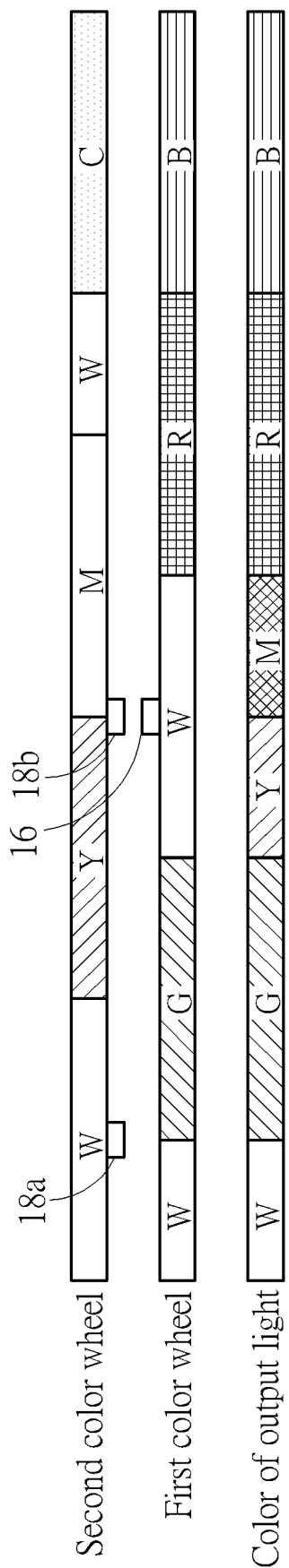
FIG. 5 is another schematic diagram illustrating the colors of output light after the light passes through the second color wheel and the first color wheel in sequence.
Figure 6:
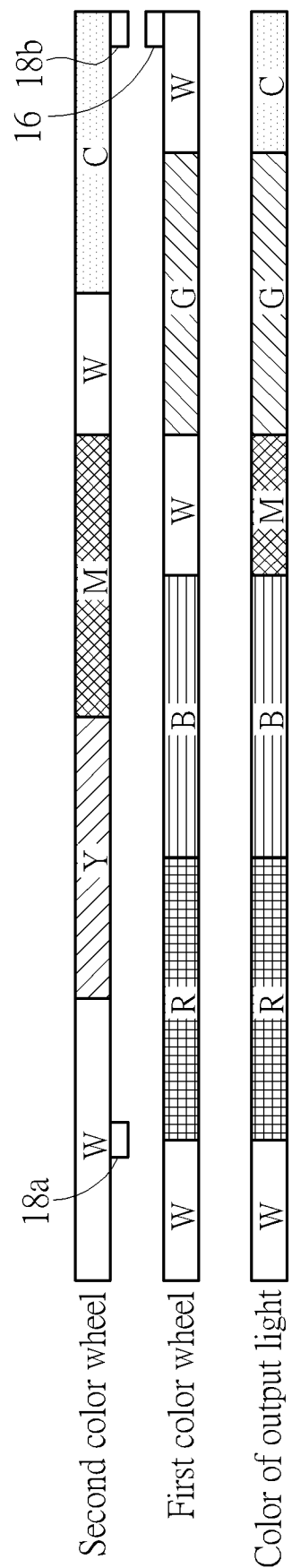
FIG. 6 is another schematic diagram illustrating the colors of output light after the light passes through the second color wheel and the first color wheel in sequence.

Referring to FIGS. 5 and 6, FIG. 5 is another schematic diagram illustrating the colors of output light after the light passes through the second color wheel 14 and the first color wheel 12 in sequence and FIG. 6 is another schematic diagram illustrating the colors of output light after the light passes through the second color wheel 14 and the first color wheel 12 in sequence. As shown in FIGS. 5 and 6, the invention may change the position of the first magnet 18b on the second color wheel 14 to generate different color modes.

Figure 7:
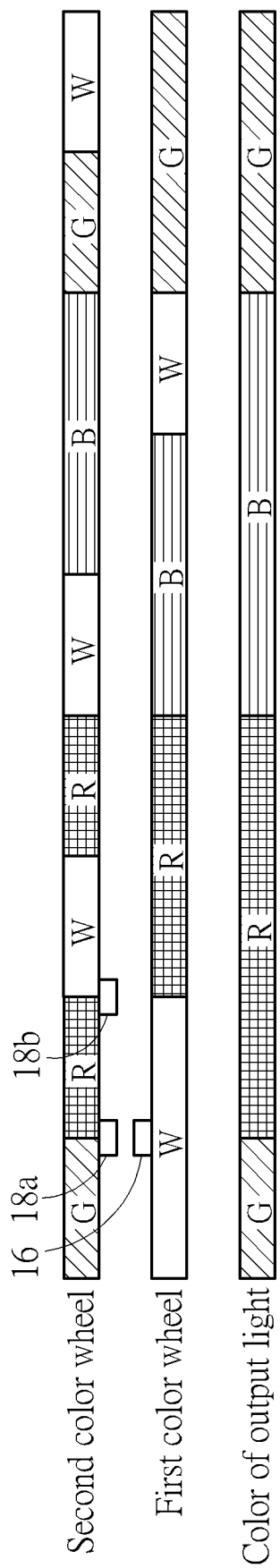
FIG. 7 is another schematic diagram illustrating the colors of output light after the light passes through the second color wheel and the first color wheel in sequence.

Referring to FIG. 7, FIG. 7 is another schematic diagram illustrating the colors of output light after the light passes through the second color wheel 14 and the first color wheel 12 in sequence. As shown in FIG. 7, the second color wheel 14 may comprise a plurality of second filters R, G, B and two transparent filters W, wherein the second filters R, G, B have primary colors including red, green and blue. At this time, the colors of output light are shown in FIG. 7 after the light passes through the second color wheel 14 and the first color wheel 12 in sequence.

Figure 8:
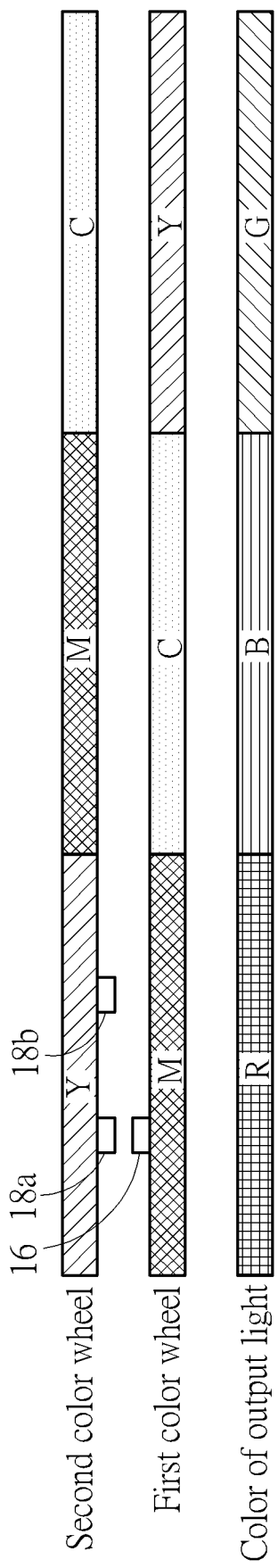
FIG. 8 is another schematic diagram illustrating the colors of output light after the light passes through the second color wheel and the first color wheel in sequence.

Referring to FIG. 8, FIG. 8 is another schematic diagram illustrating the colors of output light after the light passes through the second color wheel 14 and the first color wheel 12 in sequence. As shown in FIG. 8, the first color wheel 12 may comprise a plurality of first filters Y, M, C and the second color wheel 14 may comprise a plurality of second filters Y, M, C, wherein the first filters Y, M, C may have secondary colors including yellow, magenta and cyan and the second filters Y, M, C may have secondary colors including yellow, magenta and cyan. At this time, the colors of output light are shown in FIG. 8 after the light passes through the second color wheel 14 and the first color wheel 12 in sequence.

Accordingly, the invention may change the colors of the first filters of the first color wheel 12 and/or change the colors of the second filters of the second color wheel 14 to generate different color modes.

Figure 9B:
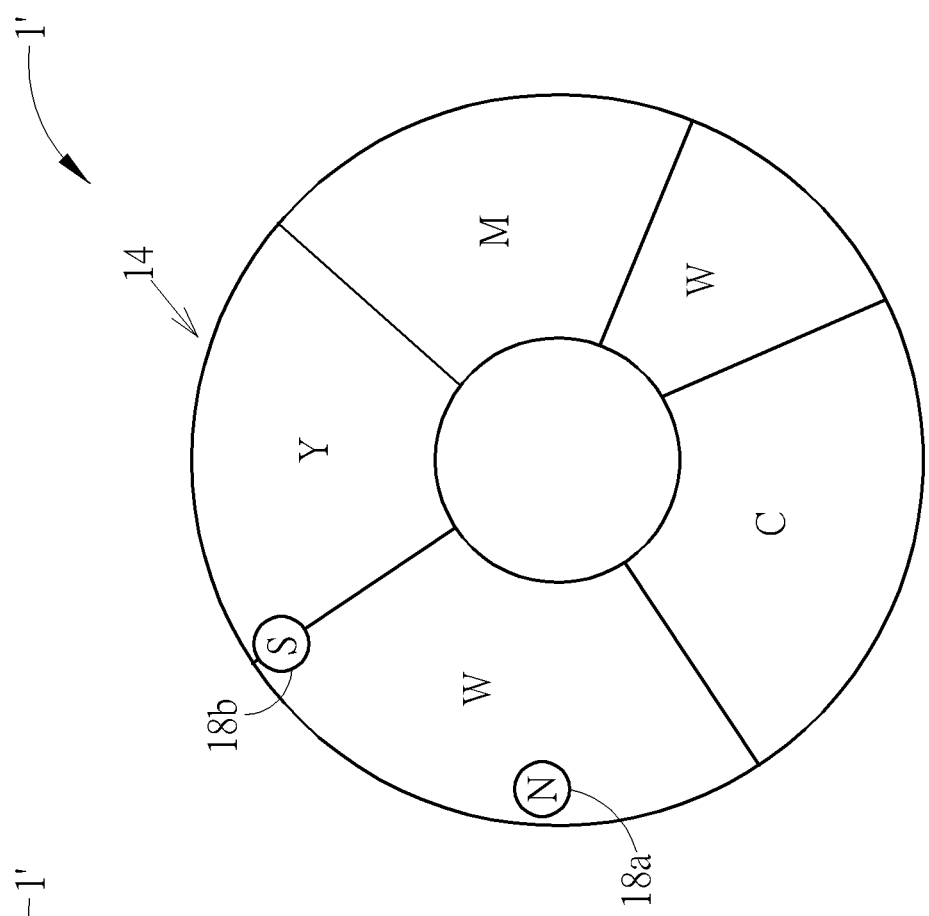
FIGS. 9A and 9B are schematic diagrams illustrating a first color wheel and a second color wheel of an optical module according to another embodiment of the invention.
Figure 9A:
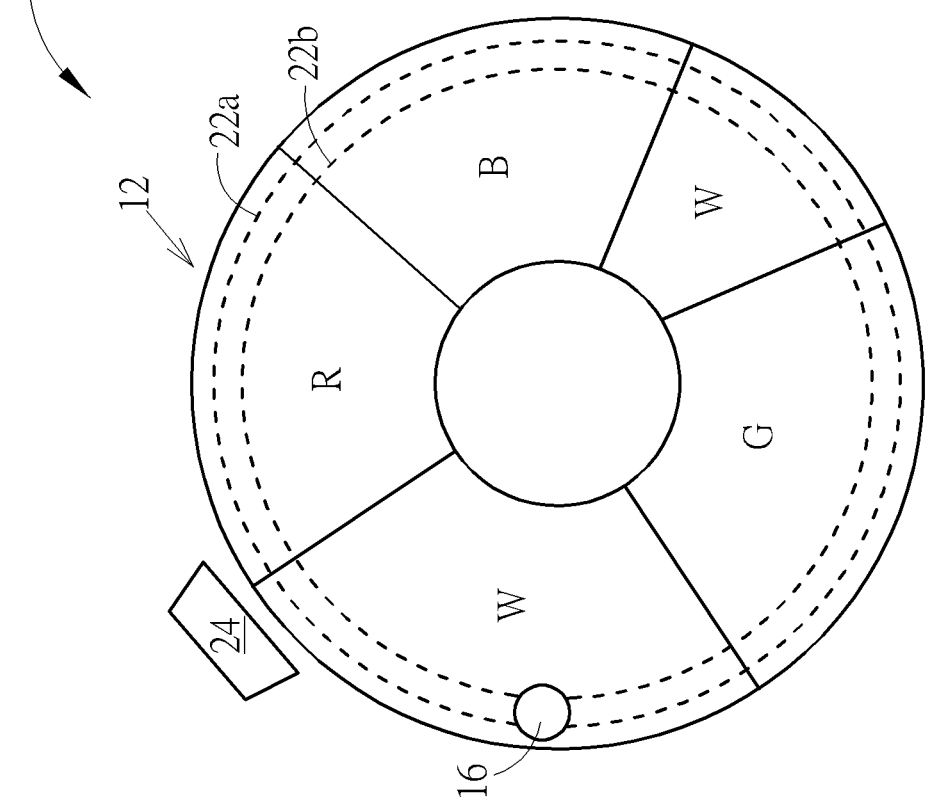

Referring to FIGS. 9A and 9B, FIGS. 9A and 9B are schematic diagrams illustrating a first color wheel 12 and a second color wheel 14 of an optical module 1' according to another embodiment of the invention. The main difference between the optical module 1' and the aforesaid optical module 1 is that the first electromagnet 16 of the optical module 1' is located at an outer side of the first filters R, G, B and the transparent filters W, and the first magnets 18a, 18b are located at an outer side of the second filters Y, M, C and the transparent filters W, as shown in FIGS. 9A and 9B. Furthermore, the optical module 1' may further comprise a magnetic sensor 24 (e.g. Hall sensor) disposed adjacent to the outer side of the first filters R, G, B and the transparent filters W. When the first color wheel 12 rotates, the magnetic sensor 24 is configured to sense a magnetic field generated by the first electromagnet 16, so as to detect a rotation speed. The outer side is opposite to the inner side. For further illustration, the outer side is a side of the filters away from a central axis of the color wheel in a radial direction of the color wheel, but is not so limited.

Figure 10:
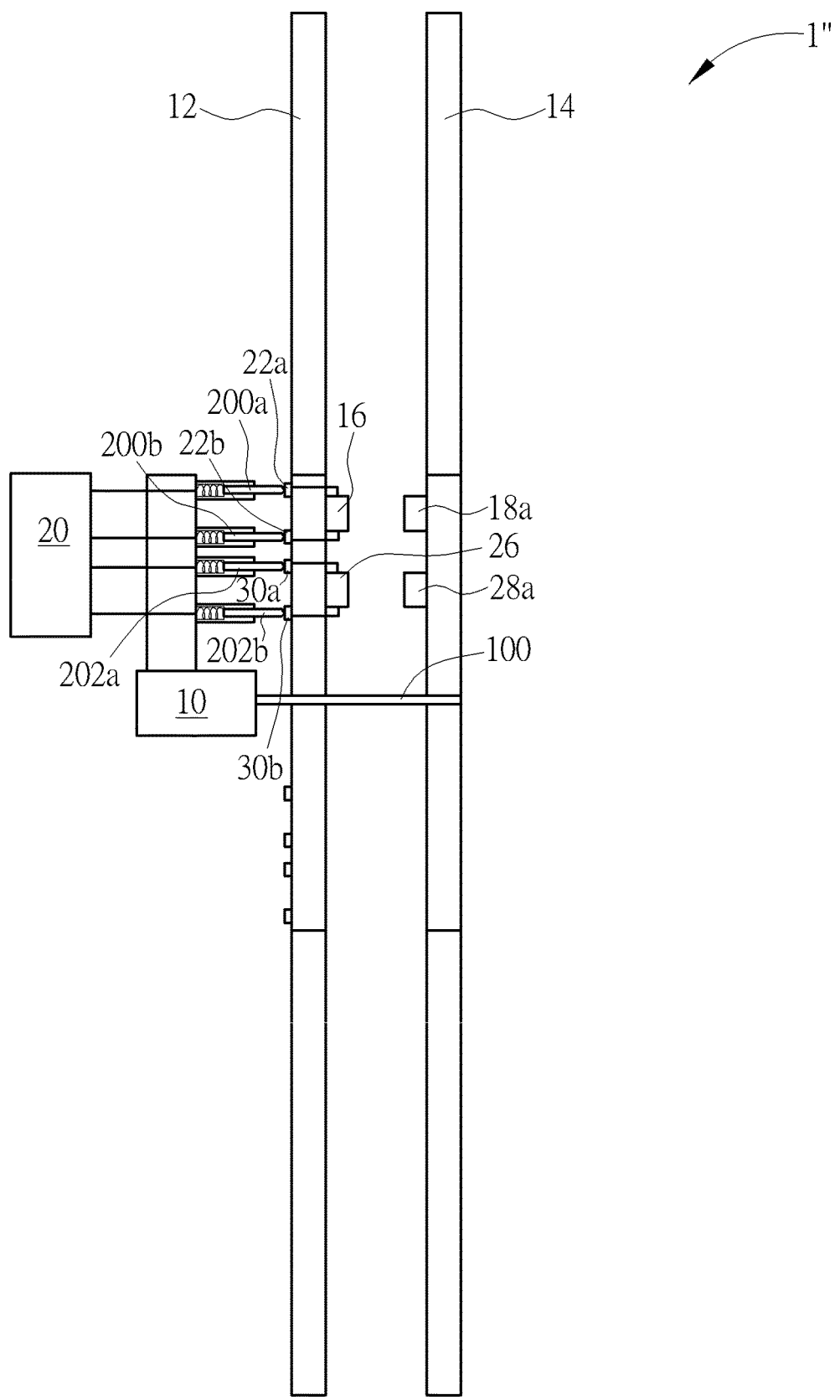
FIG. 10 is a schematic diagram illustrating an optical module according to another embodiment of the invention.
Figure 11B:
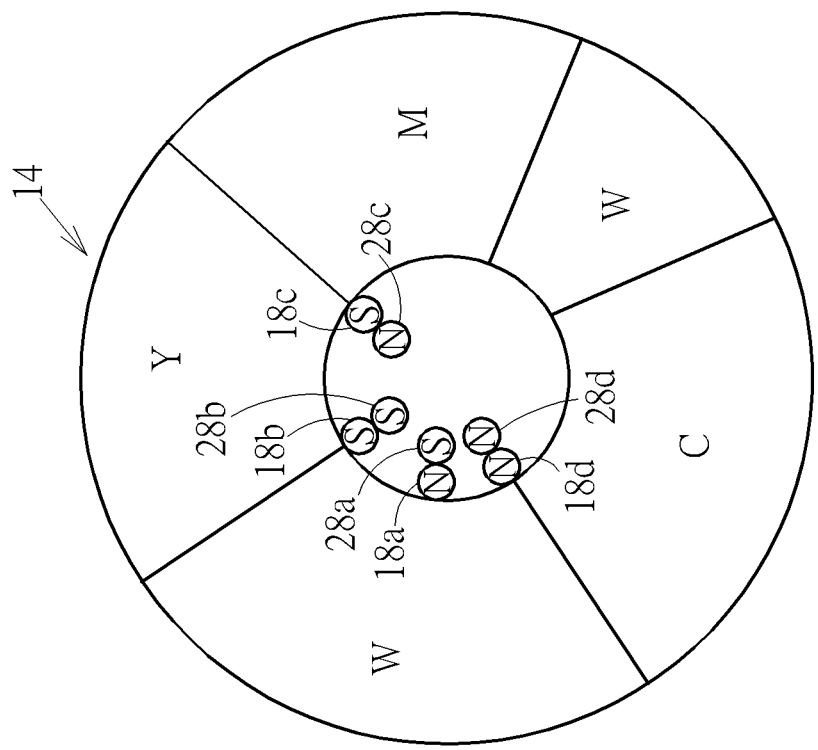
FIGS. 11A and 11B are schematic diagrams illustrating the first color wheel and the second color wheel shown in FIG. 10.
Figure 11A:
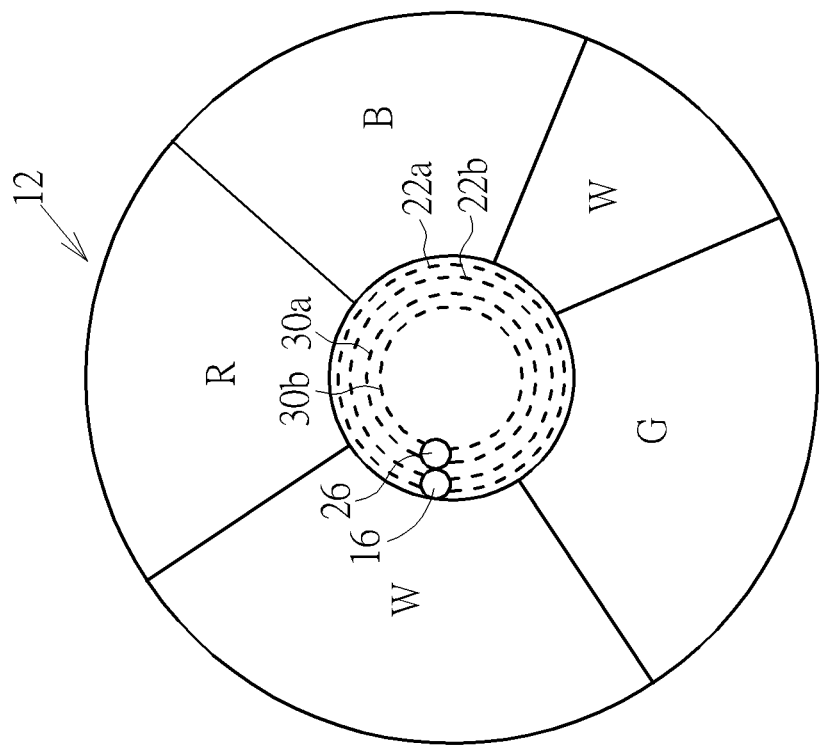

Referring to FIGS. 10, 11A and 11B, FIG. 10 is a schematic diagram illustrating an optical module 1" according to another embodiment of the invention and FIGS. 11A and 11B are schematic diagrams illustrating the first color wheel 12 and the second color wheel 14 shown in FIG. 10. The main difference between the optical module 1" and the aforesaid optical module 1 is that the optical module 1" further comprises a second electromagnet 26, a plurality of second magnets 28a, 28b, 28c, 28d and two second ring-shaped electrodes 30a, 30b, as shown in FIGS. 10, 11A and 11B. In this embodiment, the number of the first magnets corresponds to the number of the second magnets. Since the optical module 1" comprises four second magnets 28a, 28b, 28c, 28d, the optical module 1" also comprises four first magnets 18a, 18b, 18c, 18d. It should be noted that the same elements in FIGS. 10-11B and FIGS. 1-2B are represented by the same numerals, so the repeated explanation will not be depicted herein again.

The second electromagnet 26 is disposed on the first color wheel 12 and the second magnets 28a, 28b, 28c, 28d are disposed on the second color wheel 14. In this embodiment, the first electromagnetic 16 and the second electromagnetic 26 may be arranged in a radial direction of the first color wheel 12, and the first magnets 18a, 18b, 18c, 18d and the second magnets 28a, 28b, 28c, 28d may be arranged in a radial direction of the second color wheel 14. Specifically, one first magnet and one corresponding second magnet may be arranged in the radial direction of the second color wheel. For example, the first magnet 18a and the second magnet 28a may be arranged in the radial direction of the second color wheel 14, the first magnet 18b and the second magnet 28b may be arranged in the radial direction of the second color wheel 14, the first magnet 18c and the second magnet 28c may be arranged in the radial direction of the second color wheel 14, and the first magnet 18d and the second magnet 28d may be arranged in the radial direction of the second color wheel 1. Furthermore, a north pole of at least one of the second magnets 28a, 28b, 28c, 28d faces the first color wheel 12 and a south pole of at least another one of the second magnets 28a, 28b, 28c, 28d faces the first color wheel 12. As shown in FIG. 11, the south poles of the second magnets 28a, 28b may face the first color wheel 12 and the north poles of the second magnets 28c, 28d may face the first color wheel 12. Furthermore, the north poles of the first magnets 18a, 18d may face the first color wheel 12 and the south poles of the first magnets 18b, 18c may face the first color wheel 12.

The polarity control unit 20 is electrically connected to the second electromagnet 26. In this embodiment, the two second ring-shaped electrodes 30a, 30b are disposed on the first color wheel 12, and the second electromagnet 26 and the two second ring-shaped electrodes 30a, 30b are located at opposite sides of the first color wheel 12. As shown in FIG. 11, the first electromagnet 16 and the second electromagnet 26 are arranged concentrically, the two first ring-shaped electrodes 22a, 22b correspond to the first electromagnet 16, the two second ring-shaped electrodes 30a, 30b correspond to the second electromagnet 26, and the two first ring-shaped electrodes 22a, 22b and the two second ring-shaped electrodes 30a, 30b are arranged concentrically. The invention may connect two leads of the second electromagnet 26 to the two second ring-shaped electrodes 30a, 30b, such that the second electromagnet 26 is electrically connected to the two second ring-shaped electrodes 30a, 30b. Furthermore, the polarity control unit 20 may have two second pins 202a, 202b, wherein the two second pins 202a, 202b are electrically connected to the two second ring-shaped electrodes 30a, 20b. In this embodiment, the second pins 202a, 202b may be, but not limited to, pogo pins.

Since the first color wheel 12 is fixed on the rotating shaft 100 of the driving unit 10 and the first electromagnet 16 and the second electromagnet 26 are disposed on the first color wheel 12, the first electromagnet 16 and the second electromagnet 26 rotates along with the first color wheel 12 when the rotating shaft 100 of the driving unit 10 drives the first color wheel 12 to rotate. When the first color wheel 12 rotates, the first pins 200a, 200b and the second pins 202a, 202b of the polarity control unit 20 keep contact with the first ring-shaped electrodes 22a, 22b and the second ring-shaped electrodes 30a, 30b. Accordingly, the polarity control unit 20 may supply current to the first electromagnet 16 through the first pins 200a, 200b and the first ring-shaped electrodes 22a, 22b and supply current to the second electromagnet 26 through the second pins 202a, 202b and the second ring-shaped electrodes 30a, 30b, such that each of the first electromagnet 16 and the second electromagnet 26 generates a polarity. Furthermore, the polarity control unit 20 may control a direction of current flow in each of the first electromagnet 16 and the second electromagnet 26 to control the polarity of each of the first electromagnet 16 and the second electromagnet 26, such that the first electromagnet 16 attracts one of the first magnets 18a, 18b, 18c, 18d during rotation and the second electromagnet 26 attracts one of the second magnets 28a, 28b, 28c, 28d during rotation to drive the second color wheel 14 to rotate along with the first color wheel 12.

When a side of the first electromagnet 16 facing the second color wheel 14 generates a south pole and a side of the second electromagnet 26 facing the second color wheel 14 generates a north pole, the first electromagnet 16 and the second electromagnet 26 attract the first magnet 18a and the second magnet 28a during rotation to drive the second color wheel 14 to rotate along with the first color wheel 12. At this time, the colors of output light are shown in FIG. 3 after the light passes through the second color wheel 14 and the first color wheel 12 in sequence. When a side of the first electromagnet 16 facing the second color wheel 14 generates a north pole and a side of the second electromagnet 26 facing the second color wheel 14 generates a north pole, the first electromagnet 16 and the second electromagnet 26 attract the first magnet 18b and the second magnet 28b during rotation to drive the second color wheel 14 to rotate along with the first color wheel 12. At this time, the colors of output light are shown in FIG. 4 after the light passes through the second color wheel 14 and the first color wheel 12 in sequence. When a side of the first electromagnet 16 facing the second color wheel 14 generates a north pole and a side of the second electromagnet 26 facing the second color wheel 14 generates a south pole, the first electromagnet 16 and the second electromagnet 26 attract the first magnet 18c and the second magnet 28c during rotation to drive the second color wheel 14 to rotate along with the first color wheel 12. At this time, the colors of output light are shown in FIG. 5 after the light passes through the second color wheel 14 and the first color wheel 12 in sequence. When a side of the first electromagnet 16 facing the second color wheel 14 generates a south pole and a side of the second electromagnet 26 facing the second color wheel 14 generates a south pole, the first electromagnet 16 and the second electromagnet 26 attract the first magnet 18d and the second magnet 28d during rotation to drive the second color wheel 14 to rotate along with the first color wheel 12. At this time, the colors of output light are shown in FIG. 6 after the light passes through the second color wheel 14 and the first color wheel 12 in sequence. Accordingly, as long as the optical module 1" controls the polarity of each of the first electromagnet 16 and the second electromagnet 26 by the polarity control unit 20, the optical module 1' can switch a color mode rapidly according to different color requirements.

As mentioned in the above, the optical module of the invention controls the polarity of the electromagnet by the polarity control unit, such that the electromagnet attracts different magnets during rotation to switch a color mode. Furthermore, the two color wheels can be positioned with each other precisely by the magnetic attraction between the electromagnet and the magnet. Accordingly, the invention can switch the color mode rapidly according to different color requirements by simple structural configuration and magnetic attraction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical module comprising:
a driving unit having a rotating shaft;
a first color wheel fixed on the rotating shaft, the first color wheel comprising a plurality of first filters;
a second color wheel freely disposed on the rotating shaft, the second color wheel comprising a plurality of second filters;
a first electromagnet disposed on the first color wheel;
a plurality of first magnets disposed on the second color wheel, a north pole of at least one of the first magnets facing the first color wheel, a south pole of at least another one of the first magnets facing the first color wheel; and
a polarity control unit electrically connected to the first electromagnet;
wherein the driving unit drives the first color wheel to rotate, such that the first electromagnet rotates along with the first color wheel; the polarity control unit controls a direction of current flow in the first electromagnet to control a polarity of the first electromagnet, such that the first electromagnet attracts one of the first magnets during rotation to drive the second color wheel to rotate along with the first color wheel.

2. The optical module of claim 1, further comprising two first ring-shaped electrodes disposed on the first color wheel, the first electromagnet and the two first ring-shaped electrodes being located at opposite sides of the first color wheel, the first electromagnet being electrically connected to the two first ring-shaped electrodes, the polarity control unit having two first pins, the two first pins being electrically connected to the two first ring-shaped electrodes.

3. The optical module of claim 1, wherein the first filters have primary colors and the second filters have secondary colors.

4. The optical module of claim 1, wherein the first filters and the second filters have primary colors.

5. The optical module of claim 1, wherein the first filters and the second filters have secondary colors.

6. The optical module of claim 1, wherein the first electromagnet is located at an inner side of the first filters and the first magnets are located at an inner side of the second filters.

7. The optical module of claim 1, wherein the first electromagnet is located at an outer side of the first filters and the first magnets are located at an outer side of the second filters.

8. The optical module of claim 7, further comprising a magnetic sensor disposed adjacent to the outer side of the first filters and configured to sense a magnetic field generated by the first electromagnet.

9. The optical module of claim 1, further comprising:
a second electromagnet disposed on the first color wheel, the polarity control unit being electrically connected to the second electromagnet; and
a plurality of second magnets disposed on the second color wheel, a north pole of at least one of the second magnets facing the first color wheel, a south pole of at least another one of the second magnets facing the first color wheel;
wherein the driving unit drives the first color wheel to rotate, such that the first electromagnet and the second electromagnet rotate along with the first color wheel; the polarity control unit controls the direction of current flow in each of the first electromagnet and the second electromagnet to control the polarity of each of the first electromagnet and the second electromagnet, such that the first electromagnet and the second electromagnet attract one of the first magnets and one of the second magnets during rotation to drive the second color wheel to rotate along with the first color wheel.

10. The optical module of claim 9, wherein the first electromagnetic and the second electromagnetic are arranged in a radial direction of the first color wheel, and the first magnets and the second magnets are arranged in a radial direction of the second color wheel.

11. The optical module of claim 9, further comprising:
two first ring-shaped electrodes disposed on the first color wheel, the first electromagnet and the two first ring-shaped electrodes being located at opposite sides of the first color wheel, the first electromagnet being electrically connected to the two first ring-shaped electrodes, the polarity control unit having two first pins, the two first pins being electrically connected to the two first ring-shaped electrodes; and
two second ring-shaped electrodes disposed on the second color wheel, the second electromagnet and the two second ring-shaped electrodes being located at opposite sides of the first color wheel, the second electromagnet being electrically connected to the two first ring-shaped electrodes, the polarity control unit having two second pins, the two second pins being electrically connected to the two second ring-shaped electrodes;
wherein the two first ring-shaped electrodes and the two second ring-shaped electrodes are arranged concentrically with respect to the first electromagnet and the second electromagnetic.

* * * * *